(12) United States Patent
Kim et al.

(10) Patent No.: US 9,018,304 B2
(45) Date of Patent: Apr. 28, 2015

(54) OPTICAL ADHESIVE FILM, APPARATUS INCLUDING THE SAME, AND OPTICAL ADHESIVE COMPOSITION

(75) Inventors: Lee June Kim, Uiwang-si (KR); Ji Hye Kwon, Uiwang-si (KR); Kyoung Jin Ha, Uiwang-si (KR); Kil Sung Lee, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 578 days.

(21) Appl. No.: 13/329,622

(22) Filed: Dec. 19, 2011

(65) Prior Publication Data

US 2012/0165465 A1 Jun. 28, 2012

(30) Foreign Application Priority Data

Dec. 23, 2010 (KR) .................. 10-2010-0133984

(51) Int. Cl.
| | | |
|---|---|---|
| *B32B 27/00* | (2006.01) | |
| *B32B 27/40* | (2006.01) | |
| *C08F 8/30* | (2006.01) | |
| *C08F 283/04* | (2006.01) | |
| *C08G 18/08* | (2006.01) | |
| *C08G 18/28* | (2006.01) | |
| *C08L 75/00* | (2006.01) | |
| *G02B 7/00* | (2006.01) | |
| *C09J 175/16* | (2006.01) | |
| *C08G 18/66* | (2006.01) | |
| *C08G 18/67* | (2006.01) | |
| *C08G 18/72* | (2006.01) | |
| *C08G 18/75* | (2006.01) | |
| *C08G 18/79* | (2006.01) | |
| *C08G 18/81* | (2006.01) | |
| *C09J 7/00* | (2006.01) | |
| *C08F 290/06* | (2006.01) | |

(52) U.S. Cl.
CPC ............ *C09J 175/16* (2013.01); *C08G 18/6674* (2013.01); *C08G 18/672* (2013.01); *C08G 18/725* (2013.01); *C08G 18/755* (2013.01); *C08G 18/792* (2013.01); *C08G 18/8116* (2013.01); *C09J 2201/622* (2013.01); *C09J 2475/00* (2013.01); *C09J 7/00* (2013.01); *C08F 290/067* (2013.01)

(58) Field of Classification Search
CPC ............ B32B 27/00; B32B 27/40; C08F 2/48; C08F 8/30; C08F 283/045; C08G 18/00; C08G 18/092; C08G 18/30; C08G 18/32; C08G 18/67; C08G 18/672; C08G 18/70; C08G 18/702; C08G 18/72; C08G 18/791; C08G 18/792; C08G 18/811; C08G 18/8116; C08G 18/82; C08L 75/14; C08L 75/16; C08L 2201/00; C08L 2201/08; C08L 2203/206; C08L 2666/28; C08L 2666/34; C08L 2666/78; C09J 7/00; C09J 11/06; C09J 175/14; C09J 175/16; C09J 2400/00
USPC .................. 524/507, 589, 590; 525/123, 455; 428/423.1; 359/896

See application file for complete search history.

(56) References Cited

U.S. PATENT DOCUMENTS

2010/0273909 A1* 10/2010 Ogawa et al. .................. 522/90
2011/0201717 A1 8/2011 Held et al.

FOREIGN PATENT DOCUMENTS

| CN | 101034258 A | 9/2007 |
|---|---|---|
| CN | 101613569 B | 7/2013 |
| JP | H03121183 A | 5/1991 |
| JP | 2006-104296 A | 4/2006 |
| TW | 2009-27779 A | 7/2009 |
| TW | 200942562 | 10/2009 |

OTHER PUBLICATIONS

Chinese Office Action in CN 201110435675.5, dated Jul. 8, 2013, with English translation (Kim, et al.).
Office Action mailed Jan. 9, 2013 in corresponding Taiwanese Patent Application No. 100147470.
Korean Office Action in KR 10-2010-0133984, dated Jul. 29, 2013 (Kim, et al.).

* cited by examiner

*Primary Examiner* — Patrick Niland
(74) *Attorney, Agent, or Firm* — Lee & Morse, P.C.

(57) ABSTRACT

An optical adhesive film prepared from an optical adhesive composition, an optical adhesive composition, and an apparatus, the optical adhesive composition including a urethane (meth)acrylate copolymer, a reactive monomer, and an initiator, wherein the optical adhesive film has a tensile strength of about 1 to about 70 gf/mm$^2$ at a thickness of 500 μm after curing.

18 Claims, 2 Drawing Sheets

OPTICAL ADHESIVE FILM, APPARATUS INCLUDING THE SAME, AND OPTICAL ADHESIVE COMPOSITION

BACKGROUND

1. Field

Embodiments relate to an optical adhesive film, an apparatus including the same, and an optical adhesive composition.

2. Description of the Related Art

As the market for touchscreen mobile phones continues to grow, there is an increasing interest in adhesive materials used to bond a window glass sheet of a mobile phone and a glass panel of a touchscreen sensor. An optically clear adhesive (OCA) film may be used as an adhesive material.

SUMMARY

Embodiments are directed to an optical adhesive film, an apparatus including the same, and an optical adhesive composition.

The embodiments may be realized by providing an optical adhesive film prepared from an optical adhesive composition, the optical adhesive composition including a urethane (meth) acrylate copolymer, a reactive monomer, and an initiator, wherein the optical adhesive film has a tensile strength of about 1 to about 70 gf/mm² at a thickness of 500 μm after curing.

The tensile strength may be greater than about 1 gf/mm² to less than about 70 gf/mm².

The optical adhesive film may have an elongation of about 50 to about 400% at a thickness of 500 μm after curing.

The curing may be performed at about 3,000 to about 5,000 mJ/cm².

The optical adhesive film may have an adhesive strength of about 10 to about 50 kgf to a 1.5 cm×1.5 cm glass sheet.

The urethane (meth)acrylate copolymer may include a hydroxyl group and a vinyl group.

The urethane (meth)acrylate copolymer may include a copolymer obtained by copolymerization of a urethane polyol and a (meth)acrylate monomer, the (meth)acrylate monomer having an isocyanate group and a vinyl group.

The urethane polyol may include a hydroxyl group.

The urethane polyol may be obtained by copolymerization of a polyol, an isocyanate compound represented by Formula 1, and a diisocyanate compound:

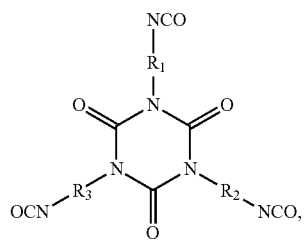

[Formula 1]

and $R_1$, $R_2$, and $R_3$ may each independently be a linear or branched C1 to C20 alkylene group.

The isocyanate compound represented by Formula 1 may include a hexamethylene diisocyanate cyclic trimer.

Repeating units derived from the hexamethylene diisocyanate cyclic trimer may be present the urethane (meth)acrylate copolymer in an amount of about 0.4 to about 1 wt %.

The embodiments may also be realized by providing an optical adhesive composition including a urethane (meth) acrylate copolymer, the urethane (meth)acrylate copolymer being obtained by copolymerization of a urethane polyol and a (meth)acrylate monomer having an isocyanate group and a vinyl group; a reactive monomer; and an initiator, wherein the optical adhesive composition has a surface contact angle of about 10° to about 60°.

The urethane (meth)acrylate copolymer may include a hydroxyl group and a vinyl group.

The urethane polyol may be obtained by copolymerization of a polyol, an isocyanate compound represented by Formula 1, and a diisocyanate compound:

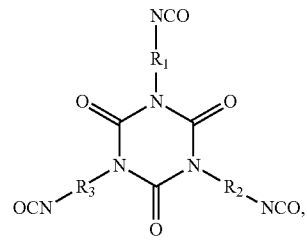

[Formula 1]

and $R_1$, $R_2$, and $R_3$ may each independently be a linear or branched C1 to C20 alkylene group.

The polyol may include at least one selected from the group of ethylene glycol, polyethylene glycol, propylene glycol, polypropylene glycol, polytetramethylene glycol, tetramethylene glycol, 1,3-butanediol, 1,4-butanediol, 1,6-hexanediol, neopentyl glycol, polycarbonate polyol, polyester polyol, and 1,4-cyclohexane dimethanol.

The diisocyanate compound may include at least one selected from the group of isophorone diisocyanate, 2,4-toluene diisocyanate, diphenylmethane diisocyanate, xylene diisocyanate, hydrogenated diphenylmethane diisocyanate, naphthalene diisocyanate, and hexamethylene diisocyanate.

The (meth)acrylate monomer having the isocyanate group and the vinyl group may include at least one selected from the group of methacryloyloxyethyl isocyanate and 3-isocyanatopropyl (meth)acrylate.

The optical adhesive composition may further include at least one selected from the group of UV absorbents and antioxidants.

The reactive monomer may include at least one selected from the group of a (meth)acrylic acid ester including a hydroxyl group and having a C1 to C20 alkyl group, a (meth) acrylic acid ester or a (meth)acrylic monomer having a C4 to C20 alicyclic ring, and a (meth)acrylic monomer having a C4 to C6 hetero-alicyclic ring including at least one heteroatom selected from the group of nitrogen, oxygen, and sulfur.

The optical adhesive composition may have a curing contraction ratio of about 2% or less.

The embodiments may also be realized by providing an apparatus including the optical adhesive film according to an embodiment.

BRIEF DESCRIPTION OF THE DRAWINGS

The embodiments will become apparent to those of ordinary skill in the art by describing in detail exemplary embodiments with reference to the attached drawings, in which.

DETAILED DESCRIPTION

Figure 1:
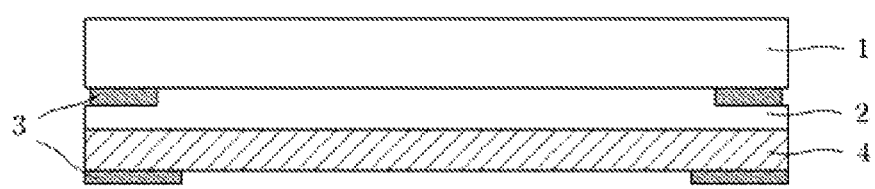
FIG. 1 illustrates an example of a capacitive touch panel of a glass type.

Korean Patent Application No. 10-2010-0133984, filed on Dec. 23, 2010, in the Korean Intellectual Property Office, and entitled: "Optical Adhesive. Film for Optically Clear Adhesive Film and Composition for the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
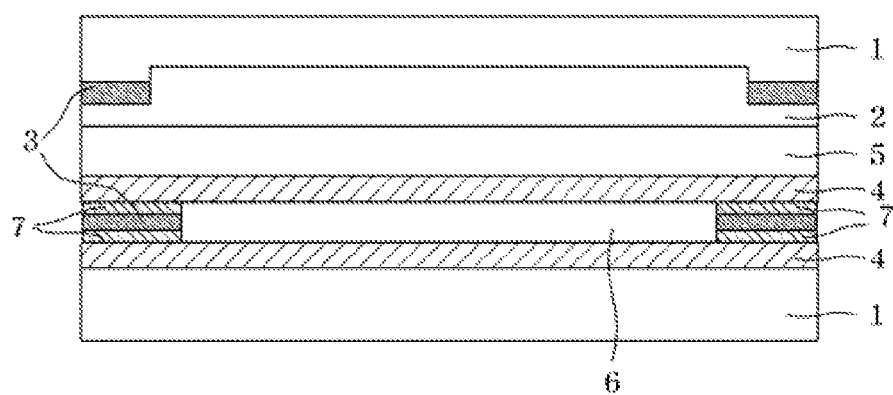
FIG. 2 illustrates an example of a resistive touch panel of a film/film/tempered glass type.

FIGS. 1 and 2 illustrate an OCA film between a window glass sheet of a mobile phone and a touchscreen panel. FIG. 1 illustrates an example of a capacitive touch panel of a glass type, in which a window glass sheet 1 and an ITO film 4 are bonded by an OCA film 2. A black material (BM) print area 3 may be on a periphery of the window glass sheet 1 and the ITO film 4. FIG. 2 illustrates an example of a resistive touch panel of a film/film/tempered glass type, in which an OCA film 2 bonds a window glass sheet 1 and a transparent conductive film 5, and the transparent conductive film 5 is bonded to an ITO film 4. A BM print area 3 may be on a periphery of the window glass sheet 1 and the ITO film 4. An air layer 6 may be between a pair of the ITO films 4. An adhesive layer 7 may be between the BM print area and the ITO film 4.

An embodiment provides an optical adhesive film prepared from an optical adhesive composition. The optical adhesive composition may include a urethane (meth)acrylate copolymer, a reactive monomer, and an initiator. The optical adhesive film may have a tensile strength of about 1 to about 70 gf/mm² at a thickness of about 500 μm after curing.

Maintaining the tensile strength at about 1 gf/mm² or greater may help ensure that the film is not too soft and thus has sufficient strength after curing. Maintaining the tensile strength at about 70 gf/mm² or less may help ensure that the strength of the film after curing is not too high, thereby ensuring sufficient impact resistance. In an implementation, the tensile strength may be greater than 1 gf/mm² to less than 70 gf/mm², e.g., greater than 10 gf/mm² to less than 70 gf/mm² or about 4 to about 30 gf/mm².

Curing may be performed at about 3,000 to about 5,000 mJ/cm², without being limited thereto.

The tensile strength may be evaluated using a specimen according to ASTM D368. For example, the optical adhesive composition may be deposited on a polyethylene terephthalate (PET) release film and cured at 3,000 mJ/cm², to form the optical adhesive film. Then, a force at which the optical adhesive film (having a thickness of about 500 μm) is broken using an Instron Series 1X/s Automated Materials Tester 3343, may be measured.

The optical adhesive film may have an elongation of about 50 to about 400% at a thickness of about 500 μm after curing. In an implementation, the optical adhesive film may have an elongation of about 245 to about 400%. Curing may be performed at about 3,000 to about 5,000 mJ/cm², without being limited thereto. Elongation may be measured by the same method as in the tensile strength using a specimen but may be defined by a distance when the specimen is broken.

The optical adhesive film may have an adhesive strength of about 10 to about 50 kgf to a glass substrate. A method of measuring the adhesion strength is not particularly limited. For example, the optical adhesive composition may be deposited to a thickness of 500 μm between a 1.5 cm×1.5 cm×1 mm upper glass sheet and a 2 cm×2 cm×1 mm lower glass sheet, and a force of separation of the upper glass sheet may be measured when pushing the upper glass sheet at a force of 200 kgf at 25° C. from a lateral side. Maintaining the adhesive strength of the optical adhesive film at about 10 to about 50 kgf may help ensure that the adhesive composition bonds well to a window glass sheet. In an implementation, the adhesive strength of the optical adhesive film to the glass substrate may be about 10 to about 30 kgf.

Urethane (meth)acrylate copolymer

The optical adhesive composition may include a urethane (meth)acrylate copolymer. In an implementation, the urethane (meth)acrylate copolymer may include a hydroxyl group and a vinyl group.

The urethane (meth)acrylate copolymer may include a copolymer obtained by copolymerization of a urethane polyol and a (meth)acrylate monomer having an isocyanate group and a vinyl group. In an implementation, the urethane polyol may include a copolymer obtained by copolymerization of a polyol, an alkylene diisocyanate cyclic trimer, and a diisocyanate compound.

For example, the urethane (meth)acrylate copolymer may be obtained by preparing the urethane polyol through polymerization of the polyol, the alkylene diisocyanate cyclic trimer, and the diisocyanate compound, and then by copolymerizing the urethane polyol with the (meth)acrylate monomer having an isocyanate group and a vinyl group.

In the urethane (meth)acrylate copolymer, the urethane polyol may include a urethane bond and a hydroxyl terminal. The urethane polyol may be prepared by copolymerization of an excess of the polyol with a relatively small amount of the alkylene diisocyanate cyclic trimer and the diisocyanate compound. Thus, the urethane polyol may include both a urethane bond and a hydroxyl terminal. The hydroxyl terminal of the urethane polyol may be polymerized with the (meth)acrylate monomer having the isocyanate group and the vinyl group to form a urethane bond, so that the final urethane (meth)acrylate copolymer may include a hydroxyl group and a vinyl group.

The urethane (meth)acrylate copolymer may have a weight average molecular weight of about 5,000 to about 40,000 g/mol.

The urethane (meth)acrylate copolymer may be present in the optical adhesive composition in an amount of about 45 to about 93.45%. Maintaining the amount of the urethane (meth)acrylate copolymer within this range may help ensure a low curing contraction ratio of the optical adhesive composition as well as high elongation and low tensile strength of the optical adhesive film. In an implementation, the urethane (meth)acrylate copolymer may be present in an amount of 50 to 89.45%.

The alkylene diisocyanate cyclic trimer may have a structure represented by Formula 1, below.

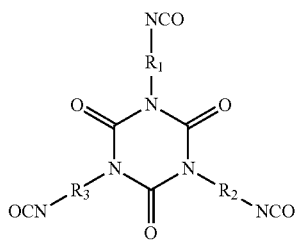

[Formula 1]

In Formula 1, $R_1$, $R_2$, and $R_3$ may each independently be a linear or branched C1 to C20 alkylene group.

In an implementation, $R_1$, $R_2$, and $R_3$ may each independently be a linear or branched C1 to C10 alkylene group.

For example, the alkylene diisocyanate cyclic trimer may be a hexamethylene diisocyanate cyclic trimer.

Repeating units derived from the alkylene diisocyanate cyclic trimer may be present in the urethane (meth)acrylate copolymer in an amount of about 0.4 to about 1 wt %. Within this range, the optical adhesive film prepared from the optical adhesive composition may exhibit good reworkability, and generation of bubbles may be reduced and/or prevented. In an implementation, the repeating units derived from the alkylene diisocyanate cyclic trimer may be present in an amount of about 0.5 to about 0.8 wt %.

In the urethane (meth)acrylate copolymer, a ratio of equivalent weights of the polyol, the alkylene diisocyanate cyclic trimer, the diisocyanate compound, and the (meth)acrylate monomer having the isocyanate group and the vinyl group may be suitably adjusted, as desired. For example, the polyol, the alkylene diisocyanate cyclic trimer, the diisocyanate compound, and the (meth)acrylate monomer having the isocyanate group and the vinyl group may be polymerized at an equivalent-weight ratio of about 1:0.02:0.76:0.2. Within this range, the urethane (meth)acrylate copolymer may have major properties, e.g., high elongation, low tensile strength, and low contraction ratio.

The polyol may include at least one selected from the group of ethylene glycol, polyethylene glycol, propylene glycol, polypropylene glycol, polytetramethylene glycol, tetramethylene glycol, 1,3-butanediol, 1,4-butanediol, 1,6-hexanediol, neopentyl glycol, polycarbonate polyol, polyester polyol, and 1,4-cyclohexane dimethanol, without being limited thereto.

The diisocyanate compound may include at least one selected from the group of isophorone, hexamethylene, and toluene diisocyanate compounds, without being limited thereto. For example, the diisocyanate compound may include at least one selected from the group of isophorone diisocyanate, hexamethylene diisocyanate, diphenylmethane diisocyanate, xylene diisocyanate, hydrogenated diphenylmethane diisocyanate, naphthalene diisocyanate, toluene diisocyanate such as 2,6-toluene diisocyanate, and 2,4-toluene diisocyanate.

The (meth)acrylate monomer having the isocyanate group and the vinyl group may include at least one selected from the group of 2-methacryloyloxyethyl isocyanate (MOI) and 3-isocyanatopropyl (meth)acrylate, without being limited thereto.

Polymerization of the polyol, the alkylene diisocyanate cyclic trimer, the diisocyanate compound, and the (meth)acrylate monomer having the isocyanate group and the vinyl group may be carried out by any suitable polymerization method, e.g., bulk polymerization, emulsion polymerization, or suspension polymerization, without being limited thereto. Polymerization may be performed at about 40 to about 80° C. for about 2 to about 24 hours.

Polymerization may be carried out in the absence of a catalyst or in the presence of a catalyst. In an implementation, the polymerization may be carried out in the presence of the catalyst to prepare the copolymer. The catalyst may include at least one selected from the group of dibutyltin dilaurate (DBTDL), triethylenediamine (TEDA), and 1,4-diazabicyclo[2.2.2]octane, without being limited thereto. The catalyst may be present in an amount of about 0.05 to about 2 parts by weight, based on 100 parts by weight of the polyol.

Reactive Monomer

The reactive monomer may include at least one selected from the group of a hydroxyl group-containing monomer, an alkyl group-containing monomer, an alicyclic group-containing monomer, a hetero-alicyclic ring-containing monomer, and a carboxyl group-containing monomer. In an implementation, the reactive monomer may include a hydroxyl group-containing monomer, an alicyclic group-containing monomer, and/or a hetero-alicyclic ring-containing monomer.

The reactive monomer may be present in the optical adhesive composition in an amount of about 5 to about 45 wt %. Within this range, the viscosity of materials may be adjusted to provide proper workability and to exhibit a low contraction ratio. In an implementation, the reactive monomer may be present in an amount of about 5 to about 40 wt %.

The hydroxyl group-containing monomer may include a vinyl monomer having a hydroxyl group, e.g., a hydroxyl group-containing (meth)acrylic acid ester which includes a hydroxyl group at a terminal or in the structure and has a C1 to C20 alkyl group. For example, the hydroxyl group-containing monomer may include at least one selected from the group of 2-hydroxyethyl (meth)acrylate, 4-hydroxybutyl (meth)acrylate, 2-hydroxypropyl (meth)acrylate, 2-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono(meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth)acrylate, 2-hydroxy-3-phenyloxypropyl (meth)acrylate, 4-hydroxycyclopentyl (meth)acrylate, 4-hydroxycyclohexyl (meth)acrylate, and cyclohexane dimethanol mono(meth)acrylate, without being limited thereto. The hydroxyl group-containing monomer may be present in the optical adhesive composition in an amount of about 1 to about 20 wt %, e.g., about 4 to about 15 wt %. Within this range, desired tensile strength of the optical adhesive film may be obtained after curing.

The alkyl group-containing monomer may include a vinyl monomer having an alkyl group (including a (meth)acrylic acid alkyl ester having a C1 to C20 linear or branched alkyl group) that is not cyclic. For example, the alkyl group-containing monomer may include at least one selected from the group of methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, 2-ethylhexyl (meth)acrylate, heptyl (meth)acrylate, octyl (meth)acrylate, nonyl (meth)acrylate, decyl (meth)acrylate, and lauryl (meth)acrylate, without being limited thereto. The alkyl group-containing monomer may be present in the optical adhesive composition in an amount of about 2 to about 20 wt %, e.g., about 4 to about 13 wt %.

Within this range, coating may be facilitated and a low curing contraction ratio may be obtained in curing.

The alicyclic group-containing monomer may include a vinyl monomer having an alicyclic ring, including (meth) acrylic acid ester or a (meth)acrylic monomer which has a C4 to C20 monoalicyclic or polyalicyclic rings. For example, the alicyclic group-containing monomer may include isobornyl (meth)acrylate, cyclopentyl (meth)acrylate, and/or cyclohexyl (meth)acrylate, without being limited thereto. The alicyclic group-containing monomer may be present in the optical adhesive composition in an amount of about 1 to about 10 wt %, e.g., about 3 to about 8 wt %. Within this range, coating may be facilitated and a low curing contraction ratio may be obtained in curing.

The heteroalicyclic ring-containing monomer may include a (meth)acrylic monomer having a heteroalicyclic ring, which may include a (meth)acrylic monomer having a C4 to C6 heterocyclic ring including at least one heteroatom selected from the group of nitrogen, oxygen, and sulfur. For example, the heteroalicyclic ring-containing monomer may include acryloyl morpholine (ACMO). The heteroalicyclic ring-containing monomer may be present in the optical adhesive composition in an amount of about 1 to about 10 wt %, e.g., about 1 to about 5 wt %. Within this range, coating may be facilitated and a low curing contraction ratio may be obtained in curing.

The carboxyl group-containing monomer may include a vinyl monomer having a carboxyl group, which may include at least one selected from the group of β-carboxyethyl(meth) acrylate, (meth)acrylic acid, itaconic acid, maleic acid, fumaric acid, vinyl acetate, acrylic acid, and methacrylic acid, without being limited thereto. The carboxyl group-containing monomer may be present in the optical adhesive composition in an amount of about 1 to about 6 wt %, e.g., about 1 to about 5 wt %. Within this range, coating may be facilitated and a low curing contraction ratio may be obtained in curing.

Initiator

The initiator may include any compound that performs a photo reaction in a UV wavelength range of about 150 to about 500 nm. For example, the initiator may include at least one selected from the group of α-hydroxyketone and phenylglyoxylate compounds. Examples of the initiator may include 1-hydroxycyclohexyl phenyl ketone, 2-[2-oxo-2-phenylacetoxyethoxy]ethyl oxyphenylacetate, benzophenone, 4-phenylbenzophenone, hydroxybenzophenone, acrylated benzophenone, 4,4'-bis(dimethylamino)benzophenone, 4,4'-bis(diethylamino)benzophenone, 2,2'-diethoxyacetophenone, 2,2'-dibutoxyacetophenone, 2-hydroxy-2-methylpropiophenone, 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, thioxanthone, 2-methylthioxanthone, benzoin, and benzoin methyl ether.

The initiator may be present in the optical adhesive composition in an amount of about 1 to about 10 wt %. Maintaining the amount of the initiator within this range may help ensure that the optical adhesive composition exhibits a low curing contraction ratio in curing and that the optical adhesive film (prepared from the optical adhesive composition) exhibits high elongation and low tensile strength. In an implementation, the initiator may be present in an amount of about 4 to about 10 wt %.

The optical adhesive composition may further include at least one selected from the group of UV absorbents and antioxidants.

The UV absorbent may help improve optical stability of the optical adhesive film prepared from the optical adhesive composition. The UV absorbent may include at least one selected from the group of benzotriazole, benzophenone, and triazine compounds. For example, hydroxyphenyl benzotriazole UV absorbents may be used. Examples of the UV absorbent may include 3-(2H-benzotriazol-2-yl)-5-(1,1-dimethylethyl)-4-hydroxy-benzenepropanoic acid C7 to C9 linear or branched alkyl ester, 2-(benzotriazole-2-yl)-4-(2,4,4-trimethylpentane-2-yl)phenol, 2-(2'-hydroxy-5'-methylphenyl)benzotriazole, 2-[2'-hydroxy-3',5'-bis(α,α-dimethylbenzyl)phenyl] benzotriazole, 2-(2'-hydroxy-3',5'-di-t-butylphenyl) benzotriazole, 2,4-dihydroxybenzophenone, 2,4-dihydroxy-4-methoxybenzophenone, 2,4-dihydroxy-4-methoxybenzophenone-5-sulfonic acid, 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, and 2,4-diphenyl-6-(2-hydroxy-4-butoxyphenyl)-1,3,5-triazine.

The UV absorbent may be present in the optical adhesive composition in an amount of about 0.1 to about 5 wt %. Within this range, the optical adhesive film (prepared from the optical adhesive composition) may be prevented from yellowing on a surface thereof after curing. In an implementation, the UV absorbent may be present in an amount of about 0.1 to about 1 wt %.

The antioxidant may help prevent oxidation of the optical adhesive film prepared from the optical adhesive composition, thereby improving thermal stability. The antioxidant may include at least one selected from the group of phenol, quinone, amine, and phosphite compounds. Examples of the antioxidant may include pentaerythritol tetrakis[3-(3,5-di-t-butyl-4-hydroxyphenyl)propionate] and tris(2,4-di-t-butylphenyl)phosphite.

The antioxidant may be present in the optical adhesive composition in an amount of about 0.01 to about 5 wt %. Within this range, the optical adhesive film (prepared from the optical adhesive composition) may be prevented from decomposing after curing and may exhibit excellent heat stability. In an implementation, the antioxidant may be present in an amount of about 0.01 to about 1 wt %.

The optical adhesive film may be prepared by depositing the optical adhesive composition according to an embodiment on a PET release film or the like and drying a solvent.

As noted above, the optical adhesive composition may include the urethane (meth)acrylate copolymer, the reactive monomer, and the initiator. In an implementation, the optical adhesive composition may have a surface contact angle of about 10° to about 60°.

Maintaining the surface contact angle at about 10° or greater may help prevent the composition from spreading too quickly, thereby helping to prevent a solution overflow in coating. Maintaining the surface contact angle at about 60° or less may help prevent the composition from spreading too slowly, thereby ensuring good coating. In an implementation, the surface contact angle may be about 15° to about 40°.

A method of measuring the contact angle is not particularly limited. For example, the contact angle may be measured by dropping liquid drips of the composition onto a flat solid substrate, e.g., the surface of a glass sheet, using a syringe, followed by taking an image thereof using a CCD camera.

The optical adhesive composition may have a curing contraction ratio of about 2% or less. The curing contraction ratio may be calculated by Equation 1, below, using a specific gravity of the optical adhesive composition in a liquid state before curing and a specific gravity of the optical adhesive film having a thickness of 200 μm obtained by depositing the optical adhesive composition on a PET release film and curing at about 3,000 to about 5,000 mJ/cm².

Curing contraction ratio (%)=(Specific gravity of adhesive composition in liquid state before curing−Specific gravity of solid adhesive composition after curing)/Specific gravity of adhesive composition in liquid state before curing×100. [Equation 1]

In an implementation, the curing contraction ratio may be about 1.1 to about 1.3%.

The optical adhesive composition may have a viscosity of about 500 to about 30,000 cps at 25° C.

The optical adhesive composition may further include at least one selected from the group of a UV absorbent and an antioxidant. The urethane (meth)acrylate copolymer, the reactive monomer, the initiator, the UV absorbent, and the antioxidant have been described above.

The optical adhesive composition may further include a solvent generally used to prepare an optical adhesive composition. The solvent may be present as a balance amount of the adhesive composition.

Another embodiment provides an apparatus including the optical adhesive film or the optical adhesive composition. An example of the apparatus may include a cellular phone. For example, the optical adhesive film or the optical adhesive composition may be used to bond a window glass sheet of a cellular phone and a touchscreen panel.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect. A description of details apparent to those skilled in the art may be omitted herein.

Preparative Example 1

Preparation of Urethane (Meth)Acrylate Copolymer 80 g of polypropylene glycol and 10 g of 1,4-butanediol were put in a 2 L four-neck flask, which was equipped with a reflux cooling system at one side, a thermometer at another side, and a dropping funnel at a third side. The solution in the flask was heated to 60° C., and 1.3 g of ditutyltin dilaurate (DBTDL) dissolved in toluene at a concentration of 10% was added thereto. 6 g of isophorone diisocyanate and 0.7 g of a hexamethylene diisocyanate cyclic trimer (HDI Trimer, DESMODUR N-330, Bayer) were sequentially added to the flask and reacted at 75° C. After identifying disappearance of remaining isocyanate using IR, the flask was cooled to 50° C., and 1 g of 2-methacryloyloxyethyl isocyanate (MOI) was added thereto. The flask was maintained at 50° C. for 2 hours, followed by identifying disappearance of remaining isocyanate using IR, thereby producing a urethane (meth)acrylate copolymer.

Preparative Example 2

Preparation of Urethane (Meth)Acrylate Copolymer 89.45 g of polypropylene glycol was put in a 2 L four-neck flask, which was equipped with a reflux cooling system at one side, a thermometer at another side, and a dropping funnel at a third side. The solution in the flask was heated to 60° C., and 1.3 g of ditutyltin dilaurate (DBTDL) dissolved in toluene at a concentration of 10% was added thereto. 9.15 g of isophorone diisocyanate and 0.7 g of a hexamethylene diisocyanate cyclic trimer (HDI Trimer, DESMODUR N-330, Bayer) were sequentially added to the flask and reacted at 75° C. Upon reaching theoretical NCO % after reaction for 3 hours, the flask was cooled to 60° C., and 3.37 g of 2-hydroxyethyl acrylate was added thereto. The flask was maintained at 60° C. for 2 hours, followed by identifying disappearance of remaining isocyanate using IR, thereby producing a urethane (meth)acrylate copolymer.

Details of components used in Examples 1 to 3 and Comparative Example 1 are described as follows.

(1) Urethane (meth)acrylate copolymer: Urethane (meth)acrylate copolymers prepared in Preparative Examples 1 and 2

(2) Reactive monomer: 4-hydroxybutyl acrylate (4-HBA), 2-hydroxyethyl methacrylate (2-HEMA), isobornyl acrylate (IBXA), acryloyl morpholine (ACMO)

(3) Initiator: Irgacure 184, Irgacure 754

(4) UV absorbent: Tinuvin 384-2

(5) Antioxidant: Irganox 1010

Examples 1 to 3

Preparation of Optical Adhesive Composition

An optical adhesive composition was prepared by mixing the components according to compositions listed in Table 1, below, and stirring the mixture for 1 hour or more.

Comparative Example 1

Preparation of Optical Adhesive Composition

An optical adhesive composition was prepared by mixing the components according to a composition listed in Table 1, below, and stirring the mixture for 1 hour or more.

TABLE 1

|  |  | Example 1 | Example 2 | Example 3 | Comparative Example 1 |
|---|---|---|---|---|---|
| Urethane (meth)acrylate copolymer (Parts by weight) | Preparative Example 1 | 77 | 67 | 87 | — |
|  | Preparative Example 2 | — | — | — | 77 |
| Reactive monomer (Parts by weight) | 4-HBA | 7 | 9 | 3 | 7 |
|  | 2-HEMA | 1 | 6 | 1 | 1 |
|  | IBXA | 8 | 8 | 3 | 8 |
|  | ACMO | 2 | 5 | 1 | 2 |
| Initiator (Parts by weight) | Irgacure 184 | 2 | 2 | 2 | 2 |
|  | Irgacure 754 | 2 | 2 | 2 | 2 |
| UV absorbent (Parts by weight) | Tinuvin 384-2 | 0.9 | 0.9 | 0.9 | 0.9 |
| Antioxidant (Parts by weight) | Irganox 1010 | 0.1 | 0.1 | 0.1 | 0.1 |

Experiment: Evaluation of Properties of Optical Adhesive Composition

Each of the optical adhesive compositions of Examples 1-3 and Comparative Example 1 was evaluated in terms of the following properties and the results are shown in Table 2, below.

<Evaluation Method>
1. Surface Contact Angle

Liquid drops (2 μl) of each composition were dropped onto the surface of a flat glass sheet from height of 3 cm using a syringe, followed by taking an image thereof using a CCD camera to measure surface contact angle.

2. Tensile Strength

A specimen was prepared and evaluated by ASTM D638. Each adhesive composition was deposited on a PET release film and cured at 3,000 mJ/cm$^2$, followed by measuring force at which the film having a thickness of 500 μm was broken using an Instron Series 1X/s Automated Materials Tester 3343.

3. Reworkability

Reworkability was evaluated with the naked eye. In Table 2, "O" indicates that residues did not remain on a surface after reworking, and "X" indicates that residues remained on a surface after reworking.

4. Formation of Bubbles

Figure 3:
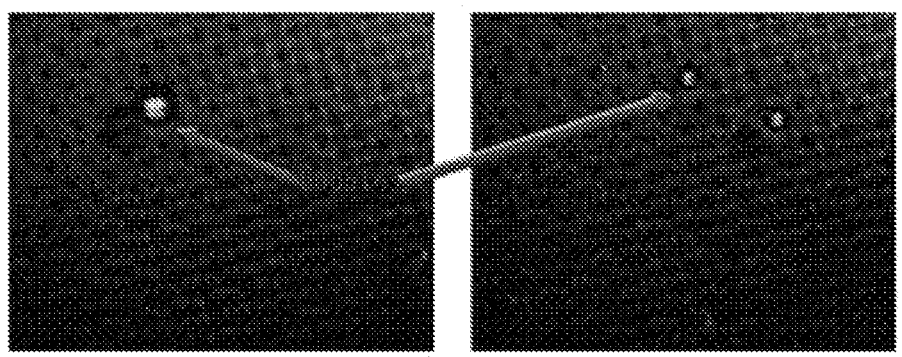
FIG. 3 illustrates an example of occurrence of bubbles in an optical adhesive film.

A front side of each composition cured at 3,000 mJ/cm$^2$ was photographed from the top using an optical microscope to observe whether bubbles were formed. The results are shown in Table 2. In Table 2, "O" indicates that bubbles were formed, and "X" indicates that bubbles were not formed. FIG. 3 illustrates examples of optical adhesive films on which bubbles were formed.

5. Curing Contraction Ratio

Each of the optical adhesive compositions of Examples 1-3 and Comparative Example 1 was cured. After the specific gravity of each optical adhesive composition in a liquid state before curing and the specific gravity of the optical adhesive film having a thickness of 200 μm (obtained by depositing the optical adhesive composition on a PET release film and curing at 3,000 mJ/cm$^2$) were measured using digital solid density measurement equipment (DME-220E, Shinko Denshi Co., Ltd.), the curing contraction ratio was calculated by Equation 1, below.

Curing contraction ratio (%)=(Specific gravity of adhesive composition in liquid state before curing−Specific gravity of solid adhesive composition after curing)/Specific gravity of adhesive composition in liquid state before curing×100.  [Equation 1]

6. Adhesive Strength

Adhesive strength between glass sheets was measured. While pushing an upper glass sheet at a force of 200 kgf at 25° C. from a lateral side, separation force was measured using a bond tester (Dage series 4000PXY).

A 1.5 cm×1.5 cm×1 mm upper glass sheet and a 2 cm×2 cm×1 mm lower glass sheet were used, and a layer of the optical adhesive film had a thickness of 500 μm.

7. Elongation

A specimen was prepared and evaluated by ASTM D638. Each adhesive composition was deposited on a PET release film and cured at 3,000 mJ/cm$^2$, followed by measuring a distance when the film having a thickness of 500 μm was broken using an Instron Series 1X/s Automated Materials Tester 3343.

8. Refractive Index

A specimen was prepared and evaluated by ASTM D1218. Each adhesive composition was deposited to a thickness of 200 μm on a release PET film and cured at 3,000 mJ/cm$^2$. The refractive index of the prepared film was measured by ABBE5 (Bellingham/Stanley Ltd.).

9. Visible Light Transmittance

Visible light transmittance was measured in a range of 400 to 800 nm using a Lambda 950 (Perkin-Elmer).

TABLE 2

|  | Example 1 | Example 2 | Example 3 | Comparative Example 1 |
|---|---|---|---|---|
| Surface contact angle (°) | 40 | 15 | 25 | 65 |
| Reworkability | O | O | O | x |
| Formation of bubbles | x | x | x | O |
| Curing contraction ratio (%) | 1.3 | 1.4 | 1.1 | 1.4 |
| Adhesive strength (kgf) | 15 | 14 | 15 | 27 |
| Elongation (%) | 250 | 245 | 260 | 210 |
| Tensile strength (gf/mm$^2$) | 10 | 30 | 4 | 85 |
| Refractive index | 1.47 | 1.47 | 1.47 | 1.45 |
| Visible light transmittance (%) | 94 | 94 | 94 | 93 |

As may be seen in Table 2, bubbles did not occur in the optical adhesive films according to Examples 1 to 3, and the optical adhesive films had good reworkability. However, the optical adhesive film formed from the composition containing a urethane (meth)acrylate polymer prepared by a general method, i.e., Comparative Example 1, had defects such as improper reworkability and formation of bubbles.

By way of summation and review, an OCA film may basically be a solid transparent tape. Thus, when the OCA film is disposed between a window glass sheet and a touch panel to bond them together, it is possible that a number of bubbles may be formed due to momentary inflow of air.

Liquid optical transparent adhesives may be used between a window glass sheet and a touch panel instead of the OCA film. However, the liquid optical transparent adhesives may not completely prevent the formation of bubbles and may cause defects when the liquid adhesive (deposited between the window glass sheet and the touch panel) is cured. Thus, the adhesives should have reworkability so as to be easily separated and reworked if a defect is generated. When a defect is detected while bonding with the OCA film, the film may be separated from an upper film of a window or a lower ITO film using a knife or thin metal wire. An optical adhesive film having good reworkability may help ensure that little time is needed to remove residual cured resin, and that materials may be reused.

The embodiments provide an optical adhesive film prepared from a composition that includes a urethane (meth)acrylate copolymer in order to help improve reworkability, to help prevent occurrence of bubbles, and to help lower production costs.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. An optical adhesive film prepared from an optical adhesive composition, the optical adhesive composition including a urethane (meth)acrylate copolymer, a reactive monomer, and an initiator, wherein the urethane (meth)acrylate copolymer includes a copolymer obtained by copolymerization of a urethane polyol and a (meth)acrylate monomer, the (meth)acrylate monomer having an isocyanate group and a vinyl group,
wherein the urethane (meth)acrylate copolymer includes a hydroxyl group and a vinyl group, and
wherein the optical adhesive film has a tensile strength of about 1 to about 70 gf/mm² at a thickness of 500 μm after curing.

2. The optical adhesive film as claimed in claim 1, wherein the tensile strength is greater than about 10 gf/mm² to less than about 70 gf/mm².

3. The optical adhesive film as claimed in claim 1, wherein the optical adhesive film has an elongation of about 50 to about 400% at a thickness of 500 μm after curing.

4. The optical adhesive film as claimed in claim 1, wherein the curing is performed at about 3,000 to about 5,000 mJ/cm².

5. The optical adhesive film as claimed in claim 1, wherein the urethane polyol includes a hydroxyl group.

6. The optical adhesive film as claimed in claim 1, wherein:
the urethane polyol is obtained by copolymerization of a polyol, an isocyanate compound represented by Formula 1, and a diisocyanate compound:

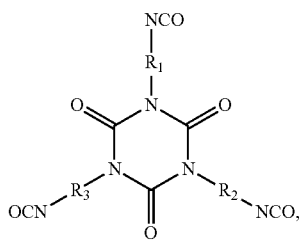

[Formula 1]

and
$R_1$, $R_2$, and $R_3$ are each independently a linear or branched C1 to C20 alkylene group.

7. The optical adhesive film as claimed in claim 6, wherein the isocyanate compound represented by Formula 1 includes a hexamethylene diisocyanate cyclic trimer.

8. The optical adhesive film as claimed in claim 7, wherein repeating units derived from the hexamethylene diisocyanate cyclic trimer are present the urethane (meth)acrylate copolymer in an amount of about 0.4 to about 1 wt %.

9. The optical adhesive composition as claimed in claim 1, wherein the optical adhesive film has an adhesive strength of about 10 to about 50 kgf to a 1.5 cm×1.5 cm glass sheet.

10. An optical adhesive composition, comprising:
a urethane (meth)acrylate copolymer, the urethane (meth)acrylate copolymer being obtained by copolymerization of a urethane polyol and a (meth)acrylate monomer having an isocyanate group and a vinyl group;
a reactive monomer; and
an initiator,
wherein the urethane (meth)acrylate copolymer includes a hydroxyl group and a vinyl group, and
wherein the optical adhesive composition has a surface contact angle of about 10° to about 60°.

11. The optical adhesive composition as claimed in claim 10, wherein:
the urethane polyol is obtained by copolymerization of a polyol, an isocyanate compound represented by Formula 1, and a diisocyanate compound:

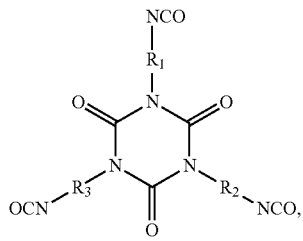

[Formula 1]

and
$R_1$, $R_2$, and $R_3$ are each independently a linear or branched C1 to C20 alkylene group.

12. The optical adhesive composition as claimed in claim 10, wherein the polyol includes at least one selected from the group of ethylene glycol, polyethylene glycol, propylene glycol, polypropylene glycol, polytetramethylene glycol, tetramethylene glycol, 1,3-butanediol, 1,4-butanediol, 1,6-hexanediol, neopentyl glycol, polycarbonate polyol, polyester polyol, and 1,4-cyclohexane dimethanol.

13. The optical adhesive composition as claimed in claim 10, wherein the diisocyanate compound includes at least one selected from the group of isophorone diisocyanate, 2,4-toluene diisocyanate, diphenylmethane diisocyanate, xylene diisocyanate, hydrogenated diphenylmethane diisocyanate, naphthalene diisocyanate, and hexamethylene diisocyanate.

14. The optical adhesive composition as claimed in claim 10, wherein the (meth)acrylate monomer having the isocyanate group and the vinyl group includes at least one selected from the group of methacryloyloxyethyl isocyanate and 3-isocyanatopropyl (meth)acrylate.

15. The optical adhesive composition as claimed in claim 10, further comprising at least one selected from the group of UV absorbents and antioxidants.

16. The optical adhesive composition as claimed in claim 10, wherein the reactive monomer includes at least one selected from the group of a (meth)acrylic acid ester including a hydroxyl group and having a C1 to C20 alkyl group, a (meth)acrylic acid ester or a (meth)acrylic monomer having a C4 to C20 alicyclic ring, and a (meth)acrylic monomer having a C4 to C6 hetero-alicyclic ring including at least one heteroatom selected from the group of nitrogen, oxygen, and sulfur.

17. The optical adhesive composition as claimed in claim 10, wherein the optical adhesive composition has a curing contraction ratio of about 2% or less.

18. An apparatus comprising the optical adhesive film as claimed in claim 1.

* * * * *